(12) United States Patent
Weissman et al.

(10) Patent No.: US 8,084,747 B2
(45) Date of Patent: *Dec. 27, 2011

(54) COMPOSITE DIELECTRIC FINS IN ENHANCED AREA BORON COATED NEUTRON DETECTORS

(75) Inventors: Eric Martin Weissman, Chagrin Falls, OH (US); James Michael Lustig, Mantua, OH (US)

(73) Assignee: General Electric, Schenectady, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/422,426

(22) Filed: Apr. 13, 2009

(65) Prior Publication Data

US 2010/0258733 A1 Oct. 14, 2010

(51) Int. Cl.
*G01T 3/00* (2006.01)
(52) U.S. Cl. .................................. 250/390.01
(58) Field of Classification Search ............. 250/390.01
See application file for complete search history.

(56) References Cited

U.S. PATENT DOCUMENTS

| | | | |
|---|---|---|---|
| 4,829,191 A * | 5/1989 | Boyar et al. | 250/496.1 |
| 6,426,504 B1 | 7/2002 | Menlove et al. | |
| 7,002,159 B2 | 2/2006 | Lacy | |
| 7,791,037 B1 * | 9/2010 | Wedding et al. | 250/374 |
| 7,910,893 B2 * | 3/2011 | Glesius et al. | 250/390.01 |
| 2003/0152823 A1 * | 8/2003 | Heller | 429/43 |
| 2009/0302231 A1 * | 12/2009 | McGregor et al. | 250/390.03 |
| 2010/0258737 A1 * | 10/2010 | McCormick et al. | 250/390.01 |

OTHER PUBLICATIONS

Bellinger, S.L., W.J. McNeil, D.S. McGregor,209, "Improved Fabrication Technique for Microstructured Solid-State Neutron Detectors," S.M.A.R.T. Laboratory, Mechanical and Nuclear Engineering Dept., Kansas State University, Manhattan, KS 66506.

McGregor, M.C., Hammig, M.D., Yang, Y.-H., Gersch, H.K., and Klann, R.T., 2003, "Design Considerations for Thin Film Coated Semiconductor Thermal Neutron Detectors—I: Basics Regarding Alpha Particle Emitting Neutron Reactive Films," Nucler Instruments & Methods in Physics Research A, 500, pp. 272-308.

McNeil, W.J., Bellinger, S.L., Unruh, T.C., Henderson, C.M., Ugorowski, P., et al. 2009, "1-D Array of Perforated Diode Neutron Detectors," Nuclear Instruments and Methods in Physics Research A, 604, pp. 127-129.

Shultis, J.K., and McGregor, D.S., 2009, "Design and Performance Considerations for Perforated Semiconductor Thermal-Neutron Detectors," Nuclear Instruments and Methods in Physics Research A, doi: 10.1016/j.nima.2009.02.033.

Unruh, T.C., Bellinger, S.L., Huddleston, D.E., McNeil, W.J., Patterson, E., et al., 2009, Design and Operation of a 2-D Thin Film Semiconductor Neutron Detector Array for Use as a Beamport Monitor, Nuclear Instrucments and Methods in Physics Research A, 604, pp. 150-153.

* cited by examiner

*Primary Examiner* — David Porta
*Assistant Examiner* — Christine Sung
(74) *Attorney, Agent, or Firm* — Pearne & Gordon LLP

(57) ABSTRACT

A neutron detector that includes a hollow member extending along and circumscribing an axis. The hollow member has an interior surface and bounds a volume. The detector also includes an anode extending within the volume. The detector also includes a cathode that includes at least one fin extending within the volume. The fin has a substrate material with at least one surface. At least part of the interior surface of the hollow member and the surface of the at least one fin have neutron sensitive material thereon.

24 Claims, 3 Drawing Sheets

COMPOSITE DIELECTRIC FINS IN ENHANCED AREA BORON COATED NEUTRON DETECTORS

BACKGROUND OF THE INVENTION

1. Field of the Invention

The invention relates to neutron detectors, and specifically relates to detectors that have improved space utilization and sensitivity.

2. Discussion of Prior Art

Recently, high sensitivity neutron detectors for homeland security has become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing for the moment upon the physical construction of neutron detectors and neutron detector arrangements, a neutron detector includes an anode and a cathode. One example detector includes a wire extending on an axis for the anode and a cylindrical cathode circumscribing the anode. Often, detector arrangements are configured to have a large number of individual detection pairs (i.e., a single cathode and a single anode) for high resolution. Such plural detectors provide an ability to determine neutron trajectory (e.g., point of origin). Also, logically, using plural detectors permits detection over a greater area than might be possible upon using just a single detector. For example, a single detector (i.e., a single anode and a single cathode) has a practical limitation on overall size.

Focusing upon boron, the majority (e.g., approximately 80%) of available boron is B-11, which has 5 protons and 6 neutrons, and the remainder (e.g., approximately 20%) is Boron 10 (B-10), which has 5 protons and 5 neutrons. Only the B-10 isotope is useful for neutron detection. Thus, for use in a neutron detector, it is typically desirable to enrich the concentration of B-10.

As mentioned, the detection of neutrons is based on the generation of secondary radiations. With B-10 ($^{10}$B) as the converter material, the reaction is described as follows when a neutron is captured:

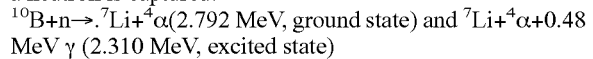
$^{10}$B+n→.$^{7}$Li+$^{4}$α(2.792 MeV, ground state) and $^{7}$Li+$^{4}$α+0.48 MeV γ (2.310 MeV, excited state)

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle (α) and a lithium nucleus ($^{7}$Li) are emitted isotropically from the point of neutron capture by B-10 in exactly opposite directions and, in the case of the dominant excited state, with kinetic-energies of 1.47 MeV and 0.84 MeV, respectively.

Turning back to physical construction of neutron detector arrangements, within a He-3 detector arrangement, each detection pair is often relatively small since the sensitivity is relatively high. This allows good resolution (i.e., the ability to discriminate neutron trajectory determination. A new generation of neutron detectors would be most beneficial if the new generation detectors provided a similar level of resolution as existing He-3 detectors without significant change to overall dimensions of the detectors. Another way of considering this idea is that the new generation of detectors must be physically similar to existing detectors so they can be easily retrofitted and must have comparable neutron sensitivity and gamma rejection as He-3.

As mentioned, the use of B-10 for neutron detection is known. However, the use of B-10 in known sensor configurations (i.e., plated onto the cathode structure of known sensors) is associated with insufficient sensitivity. Specifically, B-10 coating on the cathode structure is relatively thin and such detectors achieve only a few percent efficiency, due to the fact that the thicknesses needed for a substantial capture of neutrons exceeds the escape range of the neutron capture reaction products. In one example, the thickness of the B-10 coating is 0.4 mg/cm$^2$. So in many instances, capture reaction products cannot escape. Only conversions of neutrons in a very thin layer near the surface of the B-10 adjacent the counting gas are detected efficiently. Since this very thin, top layer of the B-10 coating captures only a very small percentage of the incident neutrons, efficiency of a neutron detector of such simple design is understandably low.

A new generation of approaches to neutron detectors would be most beneficial if the new generation provided at least a similar level of neutron sensitivity and a discrimination of gamma rays without significant change to overall dimensions of the detectors. Within the new generation of approaches to neutron detectors there may be benefit to consider materials for use within the neutron detectors.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later. One aspect of the invention provides a neutron detector that includes a hollow member extending along and circumscribing an axis. The hollow member has an interior surface and bounds a volume. The detector also includes an anode extending within the volume. The detector also includes a cathode that includes at least one fin extending within the volume. The fin has a substrate material with at least one surface. At least part of the interior surface of the hollow member and the surface of the at least one fin have neutron sensitive material thereon.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
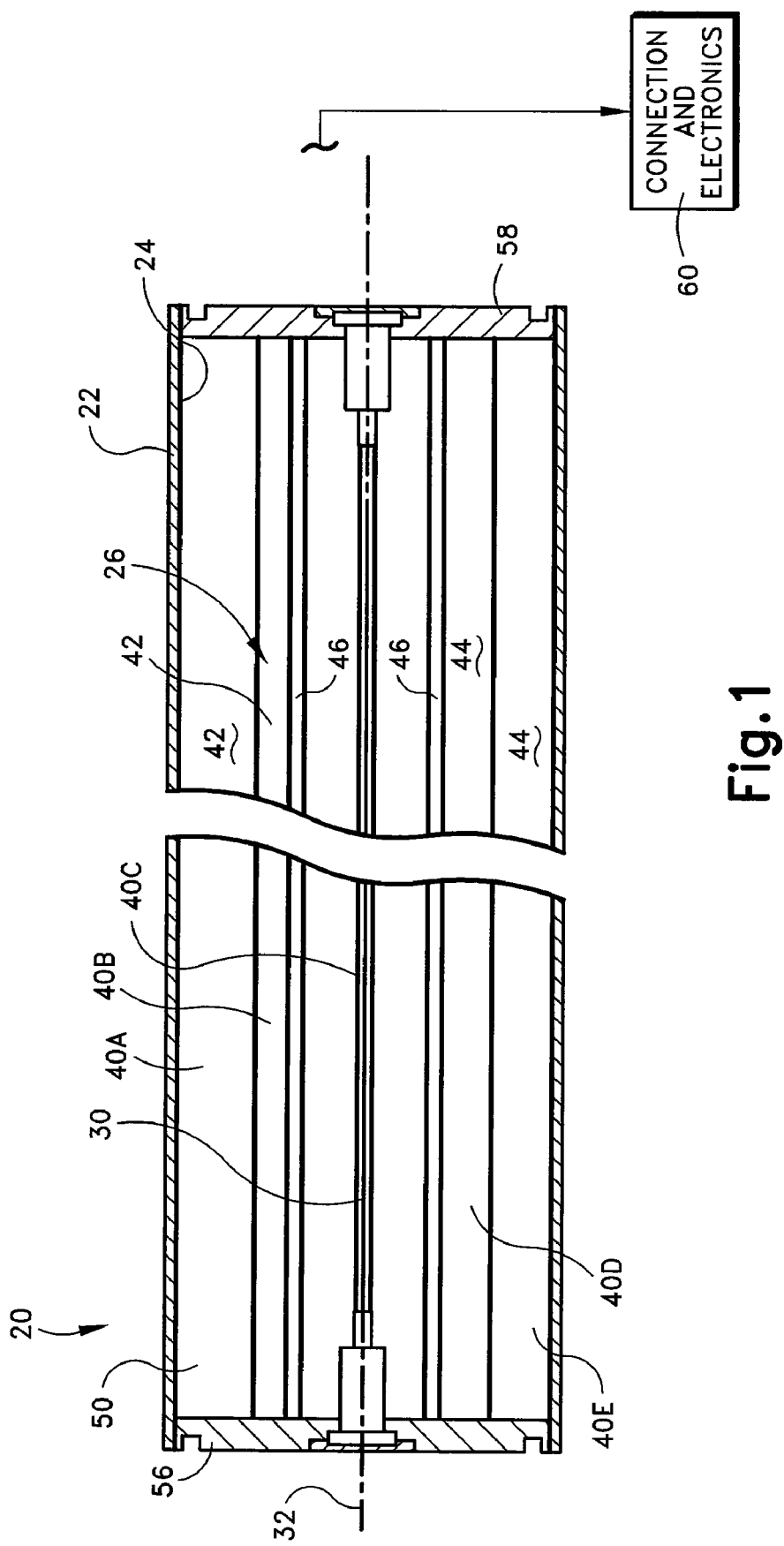
FIG. 1 is a schematic cross-section of an example neutron detector showing at least one fin in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 2:
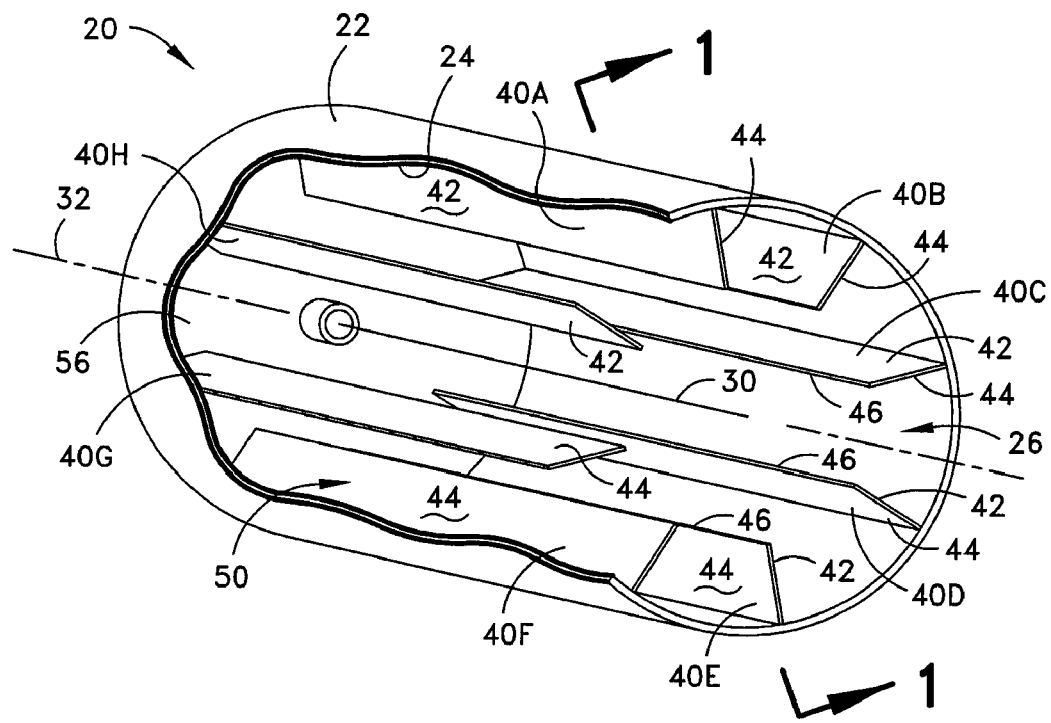
FIG. 2 is a perspective view of the example neutron detector of FIG. 1, which has been partially torn open to better show some structural aspects, with the orientation relationship between FIGS. 1 and 2 being indicated by line 1-1 in FIG. 2 to indicated the section location for FIG. 1.

An example embodiment of a neutron detector 20 that includes an aspect of the invention is shown in FIGS. 1 and 2. Basically, the neutron detector 20 includes a hollow member 22 that has an interior surface 24 bounding a volume 26. An anode electrode 30 is located within the volume 26.

In the shown example, the anode 30 is elongate and extends along an axis 32 of the neutron detector 20. In one example, the anode 30 is a wire that is in the range of 0.0254-0.0508 mm (0.001-0.002 inches) in diameter. Such a size range is merely an example. Accordingly, such an example should not be considered to be a limitation upon the invention.

In the shown example, the hollow member 22 is cylindrical and extends around the anode 30 and the axis 32. Of course, the hollow member 22 may have a different shape, such as having a plurality (e.g., six or eight) rectangular wall segments. As such, the cylindrical shape need not be a limitation. At least one fin (e.g., 40A extends within the volume 26. In the shown example of FIGS. 1 and 2, there are eight fins 40A-40H. Each fin (e.g., 40A) has surfaces 42-46. The material of the fins 40A-40H can be any suitable neutron detector cathode substrate material, such as a material with a low dielectric constant. Discussion about material selection is presented in further detail below.

At least some of the interior surface 24 of the hollow member 22 and at least some of the surfaces (e.g., at least some of 42-46) of the fins 40A-40H have neutron sensitive material located thereon. As such, the hollow member 22 and the fins 40A-40H provide a cathode 50 as a counterpart to the anode 30. In one example, the neutron sensitive material on the cathode 50 (i.e., hollow member 22 and the fins 40A-40H) is boron that is enriched to have a high content of B-10. One example of a high content of B-10 is a content of B-10 greater than 90% boron. In one example B-10 is a layer coated upon the surfaces of the cathode (i.e., the interior surface of the hollow member and the surfaces of the fins). A specific example thickness of the B-10 coating is 0.4 mg/cm$^2$. It is the presence of at least one of the fins (e.g., 40A) being part of the cathode 50 that provides at least one unique aspect of the invention. However, prior to discussion about such aspect, it would be useful to provide a basic operation of the electrode pair, anode 30 and cathode 50, for the purpose of neutron detection.

The anode 30 and cathode 50 are separated from each other within the volume 26. The volume 26 is sealed via two end plates 56, 58, and the sealed volume contains a gas such as argon and carbon-dioxide. The anode 30 is electrically conductive and electrically connected to an associated electronics arrangement 60 (shown schematically within FIG. 1) as will be appreciated by the person of skill in the art. As mentioned, the cathode 50 includes the neutron sensitive material, B-10 boron. Sensing a neutron is accomplished by a current pulse that occurs between the anode 30 and cathode 50, through the gas, when a neutron impinges upon the B-10 boron of the cathode. When a neutron is absorbed by a B-10 atom on the cathode 50, an alpha particle (i.e., a helium-4 nucleus) and lithium-7 nucleus, both positively charged, are generated and are ejected in opposite directions along a straight line, the orientation of which is random. One of these particles will not emerge from the B-10 layer because its direction of motion is not towards the cathode/gas interface. The other particle moves towards the cathode/gas interface from which it will emerge if it has enough energy. When one of these nuclear particles passes into the gas within the volume 26, the particle ionizes the gas. The negative ion particles, electrons, drift towards the anode 30 and as the negatively charged particles approach sufficiently near the anode (e.g., within 1-3 anode diameters) the negatively charge particles accelerate to the point of generating even more charge. This is called "gas gain" and it generates enough charge so that the resulting current has a perceptible effect within the associated electronics arrangement 60 operatively connected to the neutron detector 20. Thus, the current at the anode 30 is detectable and quantifiable. It is to be appreciated that in one example, the associated electronics arrangement 60 includes an electronic amplifier in order to aid in processing the current generated at the anode. The general operation/structure of neutron detectors and associated electronics arrangements will be appreciated by the person of skill in the art.

Turning back to the fin(s) (e.g., some or all of 40A-40H), it is to be appreciated that in accordance with one aspect of the invention the fin(s) provide for an increase in surface area onto which B-10 is coated as compared to coating of just the interior surface 24 of the hollow member 22. It is to be understood that for the use of B-10 as the neutron sensitive material for the cathode 50, efficient conversion of neutrons only occurs within a very thin layer near the exterior surface of the B-10 layer. As such, increased surface area for a B-10 cathode is beneficial. It should be appreciated that the function of the fin(s) (e.g., some or all of 40A-40H) can be considered to provide the increase in surface area within the interior of the detector 20.

Focusing upon the material of the substrate 22, it is to be appreciated that various materials may be selected. Selection of certain materials may provide some advantages and/or some disadvantages. It is to be noted that use of a metal for a substrate material, although, possible, may have some associated drawbacks. For example, the presence of the metal conductors may reduce the electric field within the detector which will reduce sensitivity. More specifically, as the above discussion about the operation of the detector indicates, it is the presence of an electric field within the detector that is part of the operation. Changes to the field caused by the presence of metal conductors can result in degradation of the field. As one specific example, disruptions to the electric field caused by a metal conductor will result in recombination of charged particles and thus loss in signal.

One aspect of the invention is directed to the selection of material that will avoid degradation of the electric field or at least minimize the field degradation and yet allow the use of fins to increase the amount of boron-coated surface area within the neutron detector 20. One example of a substrate material that provides a beneficial avoidance of electric field degradation is a material with a low dielectric constant (permittivity). It is to be noted that boron, which may be used within the coating layer 24, has a dielectric constant that is approximately 4. In one respect it would be useful to have a substrate 22 that has a dielectric constant lower than the boron dielectric constant. In one specific example, the dielectric constant for such substrate material is about 1. In another somewhat broader example, the range of the dielectric constant for the substrate material is less that 2. In yet a still broader example, the range of the dielectric constant for the substrate material is less that 2.5. Some example materials that may be unitized for the substrate material include plastics, TEFLON® (polytetrafluoroethylene), KYNAR® (polyvinylidene fluoride), NYLON, polyethelyene, polypropylene, polycarbonate, polystyrene, tetrafluoroethylene, polychlorotrifluoroethylene (KEL-F) and FORMICA® (composite thermoset plastic laminate). Other materials that have low dielectric values are possibly also useable. The invention is intended to encompass use of such other materials with low dielectric constant values for the substrate materials and the non-inclusion on the example list herein should not be negatively construed. The aspect is to avoid or minimize disruption to the electric field within the neutron detector 22.

It is to be noted that other aspects, factors, features of potential substrate materials may be taken into consideration during the selection process. As one example, some materials may have a propensity to outgas. Specifically, a specific material may emit gaseous chemical(s). A consideration for outgassing has two aspects. The first aspect is the duration of the outgassing and the second is the volume of emitted gaseous chemical(s). The two aspects may be related, with a decrease in outgassing occurring as time processes. In general, outgassing could be a dissuasion to use a particular material as a substrate for the fin. Specifically, dependent upon the specific chemical(s) and/or volume of the outgassed chemicals, degradation of the operation of the neutron detector could occur. Some of the mentioned examples have fairly low outgassing values. For example, degassed Teflon, Kel F, and polyethelyne are all known to have outgassing values of less than $1.0*10^6$ Torr Liters per second per square centimeter.

In one respect the fins would thus be considered a composite, with the boron being the outermost layer and the low dielectric substrate material being within. Since the substrate could logically constitute the bulk of such a composite fin since the born coating is very thin, the bulk of the composite fin would thus have a low dielectric.

Focusing now upon fin configurations, any specific structural configuration of the fin(s) need not be a limitation on the present invention. As such, details of some example embodiments are presented herein only to show some possibilities. It is to be understood that the breadth of the invention is to encompass other embodiments, variations, etc. Also, it is to be appreciated that in accordance with one aspect of the present invention, the fins may include a substrate that has a low dielectric. In one specific example, the dielectric constant for such substrate material is about 1. In another somewhat broader example, the range of the dielectric constant for the substrate material is less that 2. In yet a still broader example, the range of the dielectric constant for the substrate material is less that 2.5.

The example of FIGS. 1 and 2 has been basically described, but the following provides some additional details. The fins 40A-40H are attached to the interior surface 24 of the hollow member 22. Each fin (e.g., 40A) is planar and each extends in a respective plane that is parallel to the axis 32. In the shown example, the planes intersect the axis 32. Each fin (e.g., 40A) extends the axial length of the hollow member 22, however each fin (e.g., 40A) extends only partially radially toward the axis 32 and the anode 30 located thereat. The eight fins 40A-40H are spaced at equidistant locations about the axis 32, and as such each fin is approximately 45° from each neighboring fin. Each fin (e.g., 40A) has two major planar surfaces 42, 44 and at least an edge surface 46 closest to the axis 32 and extending between the two major surfaces. Of course, the exact dimensioning with regard to the fins 40A-40H may be varied. With all of the surfaces 42-46 of all of the fins 40A-40H coated with a layer of B-10, the amount of B-10 surface area within the sealed volume 26 increases greatly over merely the B-10 surface area of just the interior surface 24 of the hollow member 22.

Figure 3:
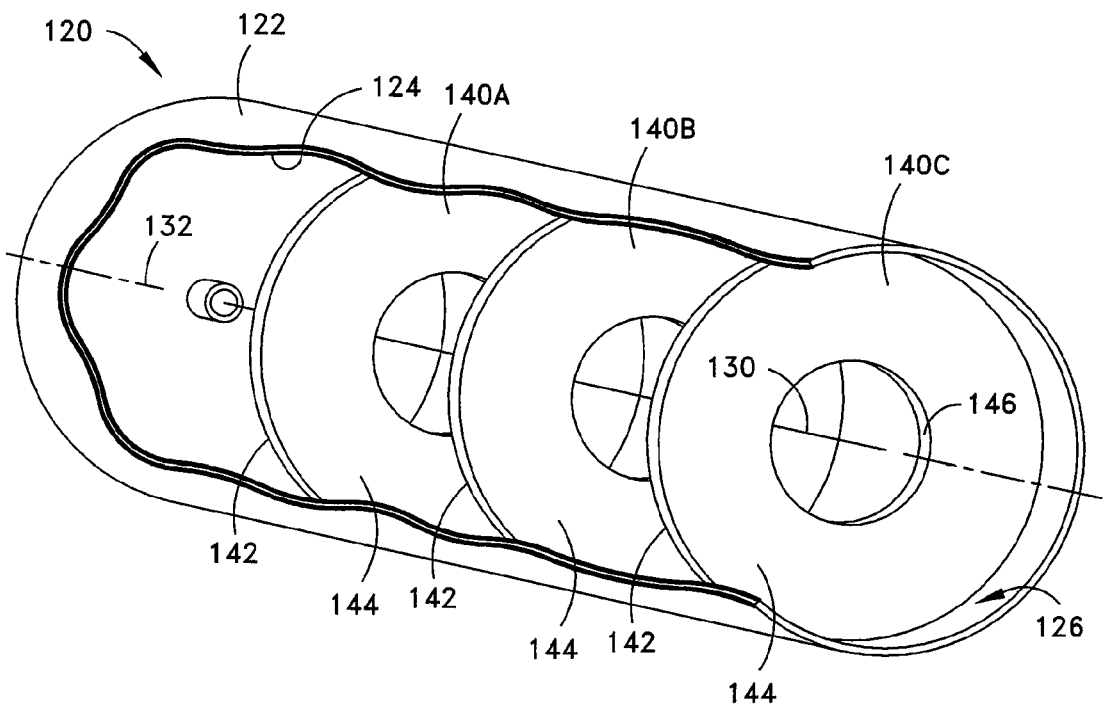
FIG. 3 is a perspective view, partially torn away, of another example neutron detector and showing at least one different type of fin in accordance with another aspect of the invention.

The example of FIG. 3 is a neutron detector 120 which is generally similar to the example of FIGS. 1 and 2 in that a hollow member 122 and an anode 130, located on an axis 132 of the hollow member, are present. Also, although not shown, suitable connections and electronics are provided. The example of FIG. 3 differs via the presence of different fins 140A-140C. Of course, the fins 140A-140C are composite, with a substrate material and a neutron sensitive (e.g., boron) coating. The selection of the substrate is done with consideration to avoid degradation of the electric field or at least minimize the field degradation and yet allow the use of fins to increase the amount of boron-coated surface area within the neutron detector 120. The selection may include considerations of selecting a substrate material with a low dielectric constant, as discussed above. Also, the selection may include a consideration about outgassing from the selected material, as discussed above.

The fins 140A-140C of the FIG. 3 example are annular fins that are oriented in respective planes that are perpendicular to the axis 132. The fins 140A-140C are attached to an interior surface 124 of the hollow member 122. Along any selected ray line direction, each fin (e.g. 140A) extends from the interior surface 124 of the hollow member 122 toward the axis 132. The fins 140A-140C terminate a distance from the axis 132. Each fin (e.g. 140A) has two major planar surfaces 144, 146 extending perpendicular to the axis 132, and a curved edge surface 146 extending between the two major surfaces and facing the axis. Three annular fins 140A-140C are shown in the example, however a different number of annular fins may be provided. The fins 140A-140C may be spaced at any desired axial distance. In one example the spacing between the fins 140A-140C is equidistant. Of course, the exact dimensioning with regard to the fins 140A-140C may be varied. With all of the surfaces 142-146 of all of the fins 140A-140C coated with a layer of B-10, the amount of B-10 surface area within a sealed volume 126 within the hollow member 122 increases greatly over merely the B-10 surface area of just the interior surface 124 of the hollow member.

Figure 4:
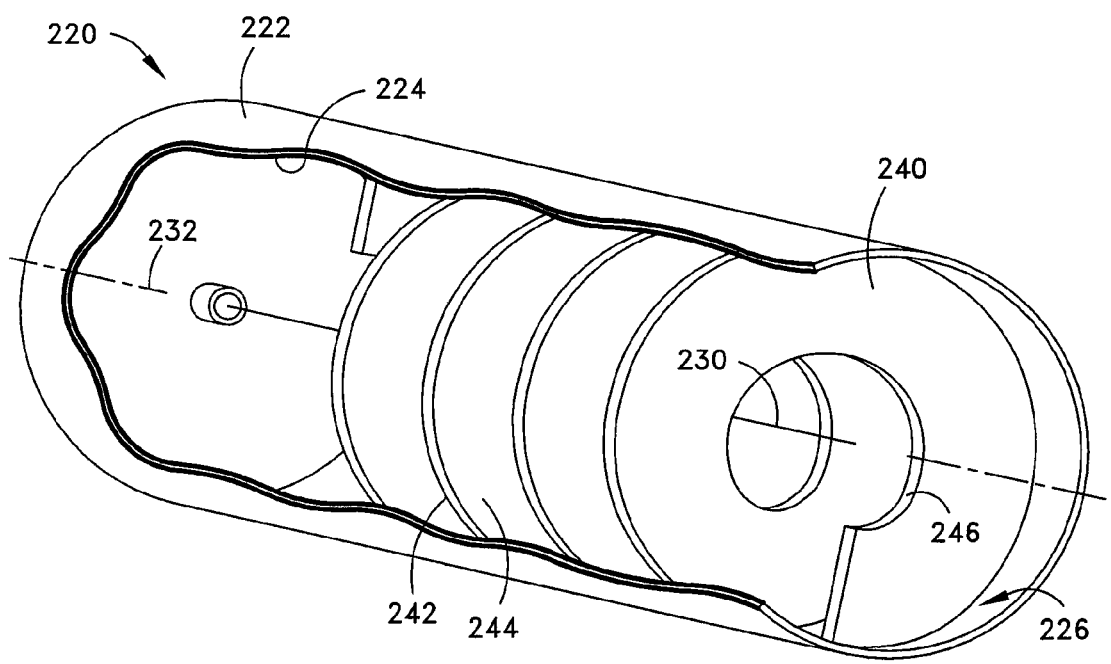
FIG. 4 is a perspective view, partially torn away, of still another example neutron detector and showing at least one still different type of fin in accordance with still another aspect of the invention.

The example of FIG. 4 is a neutron detector 220 which is generally similar to the previous examples (FIGS. 1 and 2, and FIG. 3) in that a hollow member 222 and an anode 230, on an axis 232 of the hollow member, are present. Also, although not shown, suitable connections and electronics are provided. The example of FIG. 4 differs via the presence of a different fin 240. Of course, the fin 240 is composite, with a substrate material and a neutron sensitive (e.g., boron) coating. The selection of the substrate is done with consideration to avoid degradation of the electric field or at least minimize the field degradation and yet allow the use of fins to increase the amount of boron-coated surface area within the neutron detector 220. The selection may include considerations of selecting a substrate material with a low dielectric constant, as discussed above. Also, the selection may include a consideration about outgassing from the selected material, as discussed above.

The fin 240 of the example is a single spiral fin. The fin 240 is attached to the interior surface 224 of the hollow member 222. The fin 240 has a general helix form in that it extends around the axis 232 and also extends along the axial direction. Along any selected ray line direction, the fin 240 does extend from the interior surface 224 of the hollow member toward the axis 232. The fin 240 radially terminates a distance from the axis 232. The fin 240 has two major surfaces 242, 244 (both curved), and a curved edge surface 246 extending between the two major surfaces and facing the axis 232. The shown example has just one spiral fin 240, however a different number of fins may be provided. If multiple fins are present, each fin may be just a segment of a spiral or multiple spirals may be intertwined along the axial extend. The shown example spiral fin 240 has four turns to the spiral, but the number of turns of the spiral fin may differ. Also, the turns of the spiral fin 240 are spaced equidistant, but the spacing may be varied. With all of the surfaces 242-246 of the spiral fin being coated with a layer of B-10, the amount of B-10 surface area within a sealed volume 226 of the hollow member 222 increases greatly over merely the B-10 surface area of just the interior surface 224 of the hollow member.

Figure 5:
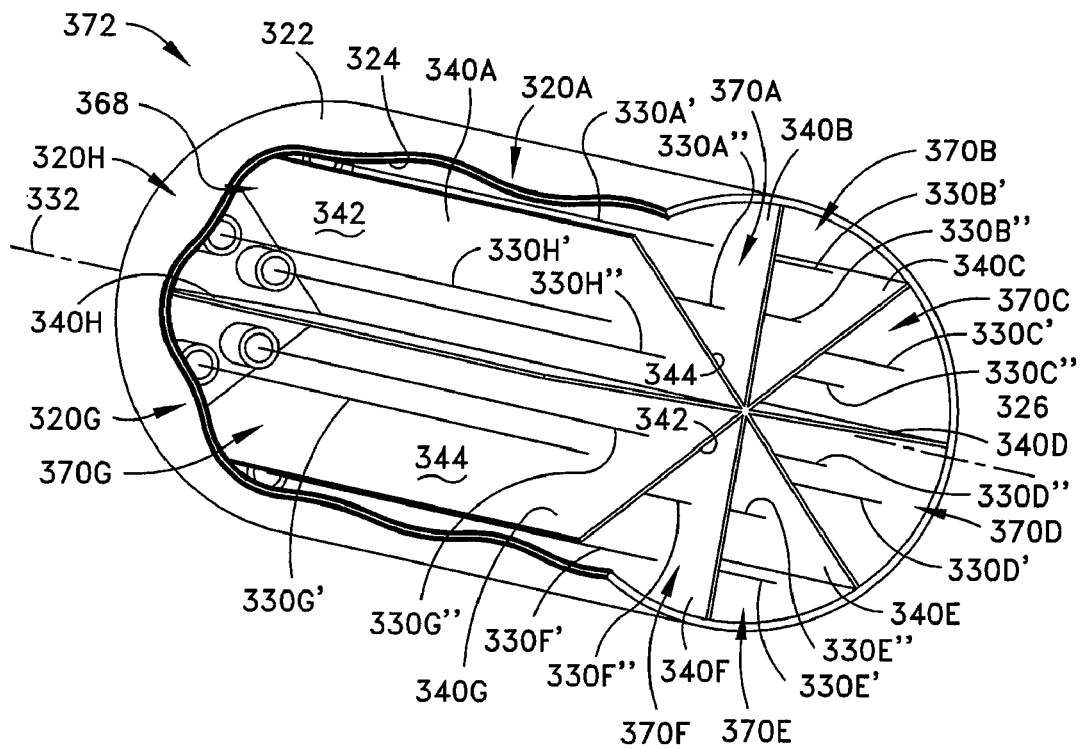
FIG. 5 is a perspective view, partially torn away, of an example of a neutron detector array and showing at least one different type of fin in accordance with yet another aspect of the invention.

FIG. 5 provides an example of the use of fins 340A-340H within a hollow member 322 that has some similarities, but a greater amount of dissimilarities to the previous examples. The example of FIG. 5 has the hollow member 322 and at least one anode (e.g., 330A'). Also, although not shown, suitable connections and electronics are provided. The example of FIG. 5 includes eight fins 340A-340H that are within a volume 326 of the hollow member 332, but the fins are connected to form a divider 368. Of course, the fins 340A-340H are composite, with a substrate material and a neutron sensitive (e.g., boron) coating. The selection of the substrate is done with consideration to avoid degradation of the electric field or at least minimize the field degradation and yet allow the use of fins to increase the amount of boron-coated surface area. The selection may include considerations of selecting a substrate material with a low dielectric constant, as discussed above. Also, the selection may include a consideration about outgassing from the selected material, as discussed above.

The fin divider 368 extends parallel to an axis 332 within the hollow member 22 to divide the volume 326 into a plurality (i.e., eight) of volume portions 370A-370H. In the shown example, the divider 368 is centered on the axis 332. As such the eight fins 340A-340H can be defined as spokes extending radially outward from the axis 332 to engage the hollow member 322. The fins 340A-340H are evenly spaced about the axis (i.e., at 45° intervals). Thus, the volume portions 370A-370H are all the same (i.e., same shape and size). Each fin (e.g., 340A) is planar and each extends in a respective plane that is parallel to the axis 332. Specifically, the planes intersect the axis 332. In the shown example, each fin (e.g., 340A) extends the axial length of the hollow member 322. Each fin (e.g., 340A) has two major planar surfaces 342, 344. With all of the surfaces 342, 344 of all of the fins 340A-340H coated with a layer of B-10, the amount of B-10 surface area within the sealed volume 326 increases greatly over merely the B-10 surface area of just the interior surface 324 of the hollow member 322.

As mentioned, the example of FIG. 5 has at least one anode (e.g., 330A'). With the fin divider 368 being centered upon the axis 332, an anode is not located at the axis. Instead, plural anodes 330A'/330A"-330H'/330H" are provided and at least one anode (e.g., 330A') is located in each volume portion (e.g., 370A). In the shown example two anodes (e.g., 330A'/330A") are located in each volume portion (e.g., 370A), although the use of multiple anodes within each volume portion is not required.

With the separating fin divider 368 sufficiently coated with neutron sensitive B-10 material and with at least one anode (e.g., 330A') within each volume portion (e.g., 370A), each volume portion defines an individual neutron detector (e.g., 320A). Thus, the example of FIG. 5 is operable as a neutron detector array 372. Another way of considering the example of FIG. 5 is that with all of the surfaces 342, 344 of the fins 340A-340H being coated with a layer of B-10, the amount of B-10 surface area within the sealed volume 326 there is a sufficient increase over merely the B-10 surface area of just the interior surface 324 of the hollow member 322 to utilize the hollow member as part of an neutron detector array 372 as opposed to use as part of just a single detector.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A neutron detector including:
   a hollow member extending along and circumscribing an axis, the hollow member having an interior surface and bounding a volume;
   an anode extending within the volume; and
   a cathode including at least one fin extending within the volume, the fin having a substrate material with at least one surface, at least part of the interior surface of the hollow member and the surface of the at least one fin having neutron sensitive material thereon.

2. A neutron detector as set forth in claim 1, wherein the substrate material has a dielectric constant less than 2.5.

3. A neutron detector as set forth in claim 2, wherein the substrate material has a dielectric constant less than 2.

4. A neutron detector as set forth in claim 1, wherein the substrate material is non-metal.

5. A neutron detector as set forth in claim 1, wherein the substrate material is selected from the group of polytetrafluoroethylene, polyvinylidene fluoride, NYLON, polyethelyene, polypropylene, polycarbonate, polystyrene, tetrafluorethylene, polychlorotrifluoroethylene (KEL-F) and composite thermoset plastic laminate.

6. A neutron detector as set forth in claim 1, wherein the substrate material has a outgassing value of less than $1.0*10^6$ Torr Liters per second per square centimeter.

7. A neutron detector as set forth in claim 1, wherein the at least one fin extends from the interior surface of the hollow member.

8. A neutron detector as set forth in claim 7, wherein the hollow member has a cylindrical shape that circumscribes the axis.

9. A neutron detector as set forth in claim 8, wherein the at least one fin extends radially inward from the interior surface of the hollow member.

10. A neutron detector as set forth in claim 9, wherein the at least one fin is planar and extends in a plane parallel to the axis.

11. A neutron detector as set forth in claim 9, wherein the at least one fin is planar and extends in a plane perpendicular to the axis.

12. A neutron detector as set forth in claim 8, wherein the at least one fin is spiral to extend both radially inward from the interior surface of the hollow member and along an axial extent.

13. A neutron detector as set forth in claim 1, wherein the at least one fin is planar and extends in a plane parallel to the axis.

14. A neutron detector as set forth in claim 1, wherein the at least one fin is planar and extends in a plane perpendicular to the axis.

15. A neutron detector as set forth in claim 14, wherein the at least one fin is annular and extends about the axis.

16. A neutron detector as set forth in claim 1, wherein the at least one fin is spiral and extends both inward from the interior surface of the hollow member toward the axis and along an axial extent.

17. A neutron detector as set forth in claim 1, wherein the hollow member is centered about the axis and the at least one fin extends to the axis.

18. A neutron detector as set forth in claim 1, wherein the hollow member is centered about the axis and the at least one fin does not extend to the axis.

19. A neutron detector as set forth in claim 1, wherein the at least one fin is part of a multi-fin divider centered on the axis.

20. A neutron detector as set forth in claim 1, wherein the detector is part of a detector array within the hollow member, the array having a plurality of anodes extending within the volume of the hollow member.

21. A neutron detector as set forth in claim 20, wherein the at least one fin is part of a multi-fin divider centered on the axis.

22. A neutron detector as set forth in claim 21, wherein the multi-fin divider divides the volume of the hollow member into a plurality of volume portions.

23. A neutron detector as set forth in claim 1, wherein the neutron sensitive material is B-10.

24. A neutron detector as set forth in claim 18, wherein the fin having two major surfaces and the B-10 is coated on both major surfaces.

* * * * *